US009414129B2

(12) United States Patent
McRae

(10) Patent No.: US 9,414,129 B2
(45) Date of Patent: Aug. 9, 2016

(54) USING CLIENT TUNER DEVICES TO PROVIDE CONTENT FINGERPRINTING IN A NETWORKED SYSTEM

(71) Applicant: Vizio Inc., Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 169 days.

(21) Appl. No.: 14/096,394

(22) Filed: Dec. 4, 2013

(65) Prior Publication Data
US 2015/0156561 A1  Jun. 4, 2015

(51) Int. Cl.
H04H 20/14 (2008.01)
H04H 60/29 (2008.01)
H04N 21/8352 (2011.01)
H04H 60/73 (2008.01)
H04N 21/234 (2011.01)
H04N 21/426 (2011.01)
H04N 21/278 (2011.01)
H04H 60/31 (2008.01)
H04H 60/37 (2008.01)
H04H 60/59 (2008.01)
H04H 60/66 (2008.01)
H04N 21/658 (2011.01)
H04N 21/8358 (2011.01)

(52) U.S. Cl.
CPC ........... *H04N 21/8352* (2013.01); *H04H 20/14* (2013.01); *H04H 60/31* (2013.01); *H04H 60/37* (2013.01); *H04H 60/375* (2013.01); *H04H 60/59* (2013.01); *H04H 60/66* (2013.01); *H04H 60/73* (2013.01); *H04N 21/23418* (2013.01); *H04N 21/278* (2013.01); *H04N 21/4263* (2013.01); *H04N 21/6581* (2013.01); *H04N 21/8358* (2013.01)

(58) Field of Classification Search
CPC .................... H04N 21/8352; H04N 21/23418; H04N 21/4263; H04N 21/278
See application file for complete search history.

(56) References Cited

U.S. PATENT DOCUMENTS

| 7,477,739 | B2 | 1/2009 | Haitsma et al. | |
|---|---|---|---|---|
| 7,881,657 | B2 | 2/2011 | Wang et al. | |
| 8,023,757 | B2 | 9/2011 | Neogi | |
| 8,364,703 | B2 | 1/2013 | Ramanathan et al. | |
| 8,385,644 | B2 | 2/2013 | Stojancic | |
| 2004/0025176 | A1* | 2/2004 | Franklin | H04H 20/14 725/22 |
| 2005/0246282 | A1 | 11/2005 | Naslund et al. | |
| 2007/0091810 | A1* | 4/2007 | Kim | H04L 1/1635 370/236 |
| 2007/0157242 | A1* | 7/2007 | Cordray | H04H 60/33 725/46 |
| 2010/0013998 | A1* | 1/2010 | Mortensen | H04N 5/4403 348/558 |
| 2010/0265390 | A1* | 10/2010 | Zhang | G06F 17/30781 348/441 |

FOREIGN PATENT DOCUMENTS

EP   20040805898   11/2004

* cited by examiner

*Primary Examiner* — Joshua Taylor
(74) *Attorney, Agent, or Firm* — Law Office of Scott C Harris, Inc

(57) ABSTRACT

A tuner device, such as a television set, set top box, game console, personal computer with a dongle or device, creates digital fingerprints indicative of information received over a channel. The digital fingerprints are uploaded to a server along with metadata indicative of the specific tuner device that obtain them. The server maintains a tuner database based on that information, and can automatically request new fingerprints.

9 Claims, 5 Drawing Sheets

USING CLIENT TUNER DEVICES TO PROVIDE CONTENT FINGERPRINTING IN A NETWORKED SYSTEM

BACKGROUND

Fingerprinting of multimedia content, e.g., video content, has been one way for determining if the content has been stolen and uploaded to a site that permits downloading of the content without any fees imposed by the content owner. Other methods of content identification have been employed in the past including watermarking or digital signatures.

Video fingerprinting however does not rely on digital data being added to the content. A video fingerprint cannot algorithmically be "removed" because it is was never "added" to the content. In addition, a reference video fingerprint may be created at any point from any copy of the video. Video fingerprinting is not a computer intense process and may be performed by relatively low powered micro processors.

SUMMARY

The inventors realize that there is no single depository that contains and identifies every piece of content transmitted over the air and/or over clear QAM cable to consumer televisions.

Additionally, commercials can be inserted into content streams for specific content in specific regions. For example, a national television program streamed over the air (OTA) to network stations will have commercial content inserted at the broadcast station for its market. Clear QAM cable content for the same national program can have commercial content inserted into as small an area as a single zip code and in some cases a single neighborhood in a single zip code.

Ideally, every tuner device, such as such as televisions, set top boxes game consoles, tuner dongles and personal computers, could have the ability to generate fingerprints of the content it receives including commercials, bundle the fingerprint data with certain unique metadata, such as the channel number, date and time and upload the data to a server that processes the fingerprints and metadata.

The inventor recognized the need for a software application that can reside on consumer video devices with tuner capability that performs fingerprinting and uploading of the fingerprint data. A network server can then verify the program and the commercial content once the fingerprint data is uploaded.

Additional aspects include the following. The present invention takes advantage of unused or under used capabilities contained in modern televisions, set top boxes game consoles, tuner dongles, personal computers and other consumer devices supporting tuners. Software driven microprocessors contained in these devices gives the ability of the device to perform fingerprinting digital video content concurrently while the content is being used. Video fingerprints can be uploaded to servers residing on networks on the internet. These servers can verify the fingerprints against databases of known fingerprints to validate that a particular piece of content was broadcast on a specified channel at a specified time. This capability can also validate that an advertisement was presented on a specified channel and time.

An additional capability of the invention is the ability of an internet based server to determine if a channel in a particular region is being fingerprinted and if it is not, the server can determine the ON/OFF state of televisions in that region and if a television is turned OFF the server can send a request to the television to wake up and begin fingerprinting the channel. Before the instant invention this was not possible.

A digital device creating digital video fingerprints is described, where client metadata is attached to the fingerprints and then immediately uploaded or transferred to a network based fingerprint server.

Digital fingerprints uploaded to the fingerprint server are compared by the server to content fingerprints and commercial advertisement fingerprints identified by client metadata as to the channel and content the fingerprint was created from. If the client fingerprints and metadata cannot be matched then an error entry in a report will be made by the content fingerprint database 66. This can be used to prevent fraudulent fingerprints from being uploaded, since the system verifies fingerprints from tuners before adding them to the database.

The database server keeps track of tuners that are uploading fingerprints. The address of a tuner and the time of the last upload are sent by the fingerprint server to a regional tuner database for tracking. In essence, this tracks the tuners on a regional basis, thus determining specifically what each regional tuner is seeing. Moreover, since this can create a list of regional tuners, this allows scanning those tuners in order to use them to create fingerprints when necessary.

The fingerprint server can scan and create a list of regional channels not being fingerprinted from the regional fingerprint database and a list of tuners in that region that are not currently active from the regional tuner database. This allows the fingerprint server to send requests to selected client tuners to start fingerprinting a specified channel.

The actions taken by a client tuner when a request is received for starting fingerprinting is also disclosed.

BRIEF DESCRIPTION OF THE DRAWINGS in the drawings.

Figure 5:
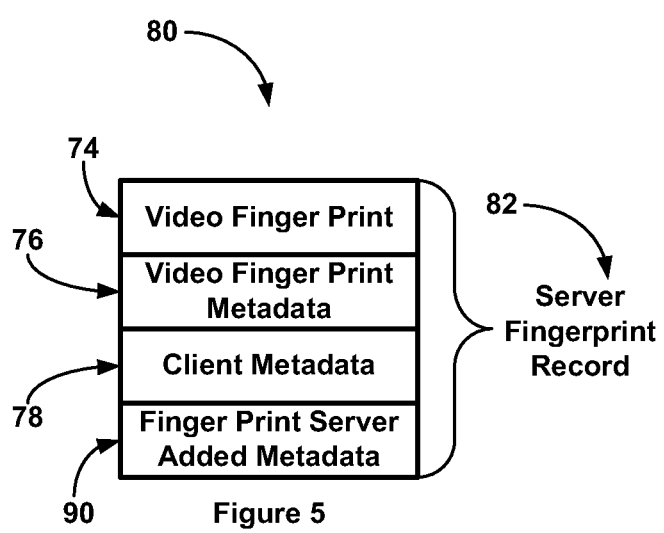
Figure 6:
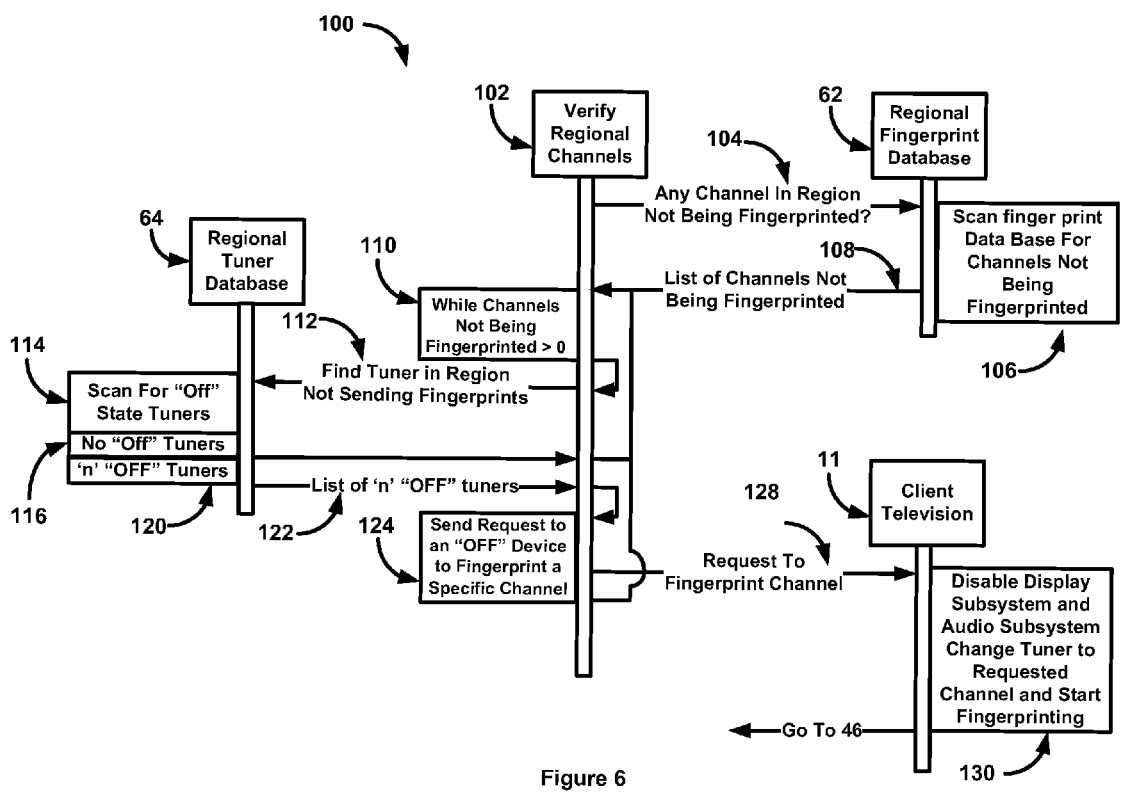

FIG. 5 is a depiction of a server fingerprint record containing fingerprint data that was constructed by a fingerprint server that receives fingerprint data from a client television FIG. 6 is a depiction of the process performed by an application being executed on a fingerprint server which determines if a given regional broadcast channel or regional clear QAM channel is not currently being fingerprinted and how the fingerprint server finds a television in that region that is currently "turned off" and how it sends a request to the television to start fingerprinting content from that channel.

DETAILED DESCRIPTION

The present invention provides the ability of a consumer device supporting a tuner, for example a television tuner, to perform tasks not previously possible.

In a preferred embodiment, a software application, when notified by the video processing subsystem of a device that a video frame is complete, will fingerprint the frame to determine some information about the frame. Once fingerprinting is complete for the current frame, the software application can add additional metadata to the fingerprint such as a local time stamp and channel number. The computer will then upload the fingerprint to a fingerprint server.

Any kind of fingerprint information can be used, however preferably the fingerprint information is information that is indicative of the video that has been received, of smaller size than the video that has been received, but which can be verified as being obtained from the video that was received. Examples include hash values, values indicative of average luminance or average chrominance, or other values that can be verified as having been received from the video information.

In another similar embodiment, the consumer device may continue fingerprinting the channel after the user has turned off the device. In this similar embodiment, the software application may, when the user turns the device "OFF", disable the display and audio subsystems which consume large amounts of power but keep other subsystems active so that fingerprints are created and uploaded to the fingerprint server.

In another preferred embodiment, the fingerprint server residing on a network may build a list of channels from the fingerprint database that are not being fingerprinted. Once the fingerprint server constructs the list of channels not being fingerprinted, it accesses a database of tuner devices in that region that are in an "OFF" state. Once the fingerprint server processes the list of devices that are "OFF", it sends a request to an "OFF" device to begin fingerprinting a specific channel in its region.

In a related embodiment, the tuner device that is in an "OFF" state will, after receiving a request from the fingerprint server:

Turn itself "ON", if possible.

Disable the display and audio subsystems.

Command the tuner to the requested channel and begin fingerprinting and uploading fingerprints to the fingerprint server.

Another embodiment can simply turn on only a portion of the tuner, enough to allow obtaining and uploading the fingerprints.

If the tuner device in this embodiment is then turned "ON" by the user the tuner device:

May or may not finish fingerprinting the current frame and upload the fingerprint data to the finger print server.

Activate the video and audio subsystems.

Change the channel to the same channel that was active when the user turned it off.

Figure 1:
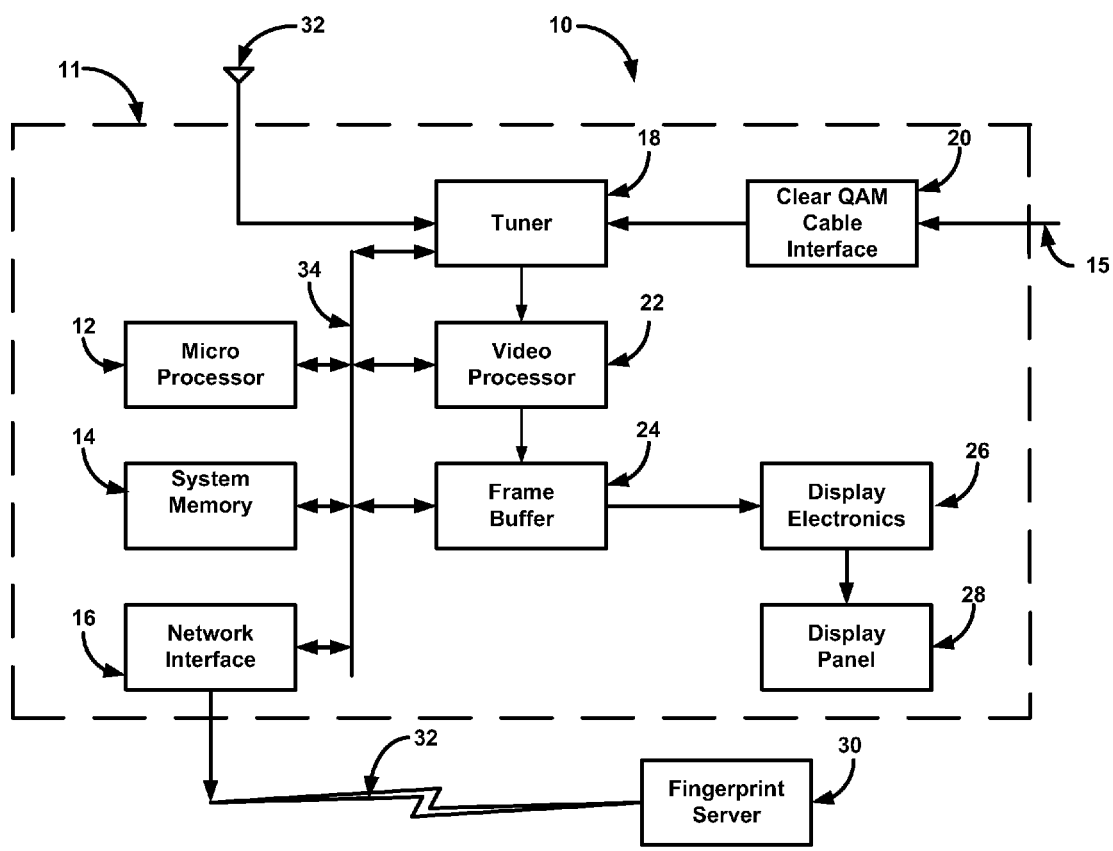
FIG. 1 is a schematic depiction of a digital television containing a tuner and having the ability to perform fingerprinting of digital video content.

Now referencing FIG. 1 where 10 depicts the functional components of a modern digital television device 11. Note that for the sake of clarity, there are components and subassemblies contained in a modern television not depicted in FIG. 1 and the modern television shown as 11 may also be a personal computer with an embedded tuner or with a connected tuner dongle or it may be a game console with an embedded tuner or tuner dongle. In this figure, the modern digital television will contain one or more microprocessors. The microprocessors may all be contained in a single integrated circuit chip or each microprocessor may be contained in a separate integrated circuit chip.

In the current depiction, only microprocessor 12 is shown in client television 11. Microprocessor 12 executes software programs or applications loaded into system memory 14 from a mass storage device.

In the instant embodiment, microprocessor 12 sends channel change commands received from user's remote controller to tuner 18.

Tuner 18 receives digital signals from antenna 32 and from clear QAM cable interface 20 over clear QAM cable 15 (and may also unscramble non-clear QAM information). Tuner 12 separates out of a signal containing multiple individual digital signals and presents a set of frequencies for a single channel to video processor 22.

Figure 2:
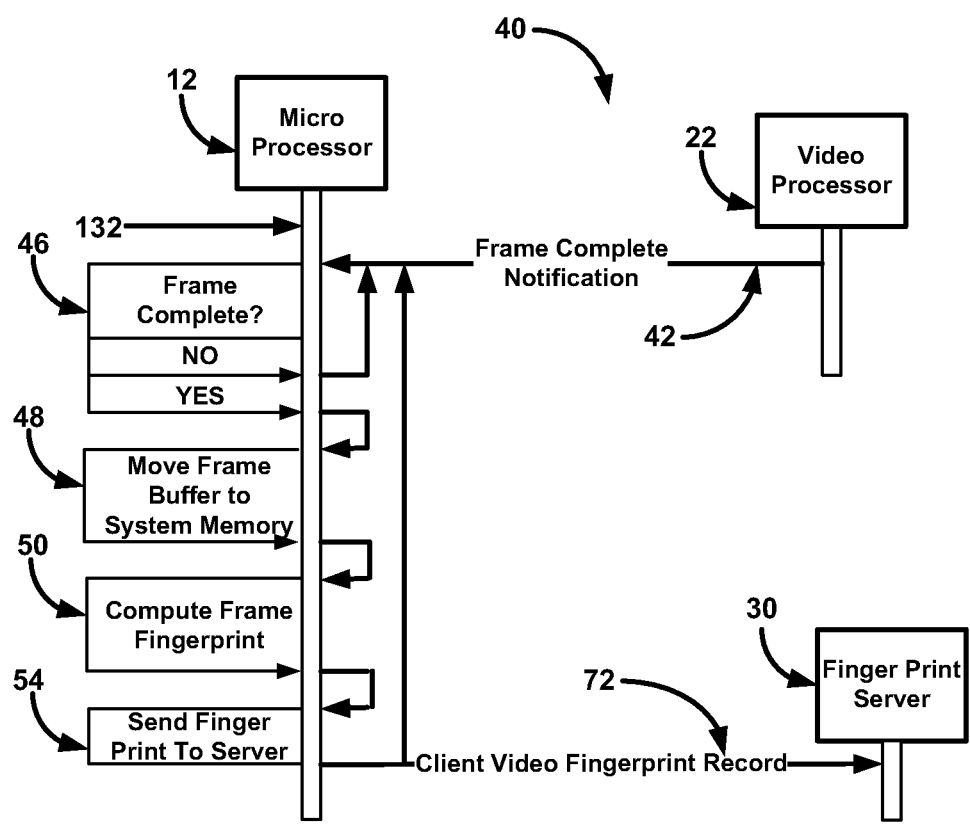
FIG. 2 is a logic diagram depicting the process for performing digital video fingerprinting and uploading the data to a server where it is processed.

FIG. 2 shows the sequence where video processor 22 processes digitized data out of a set of frequencies and constructs successive single frames of digital video. Video processor 22 (perhaps along with microprocessor 12) uses frame buffer 24 to hold the digital video data until a complete frame of data has been constructed in frame buffer 24 shown by operation 46. Once a frame is ready for viewing, video processor 22 sends the completed frame from frame buffer 24 to display electronics 26 which in turn transfers the frame to display panel 28.

Video processor 22 also sends a notice to microprocessor 12 over system bus 34 notifying microprocessor 12 that a complete frame has been constructed. Microprocessor 12 then transfers the just completed frame to system memory 14 at 48. Once the data in frame buffer 24 has been transferred to system memory 14, microprocessor 12 executes an application that generates a fingerprint for the frame at 50.

The resulting fingerprint 72 is then sent or uploaded to the finger print server 30 as shown as 54 in FIG. 2.

Figure 3:
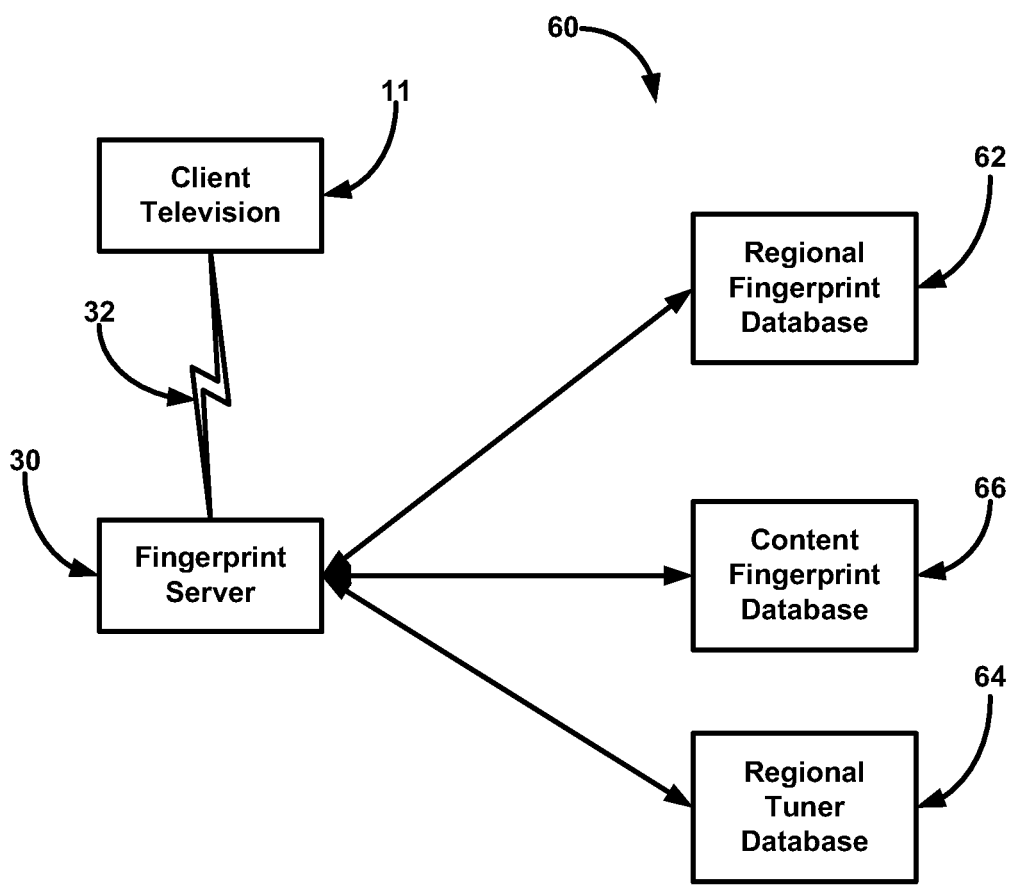
FIG. 3 is a diagram depicting the relationship between a digital television that performs digital video fingerprinting, a server that receives fingerprint data and databases used by the server to identify content based on the digital fingerprints and televisions being used to generate fingerprint data.

FIG. 3 shows fingerprint server 30 receiving information from the client television 11, and also sending information to regional and content databases, and also to a regional tuner database.

Figure 4:
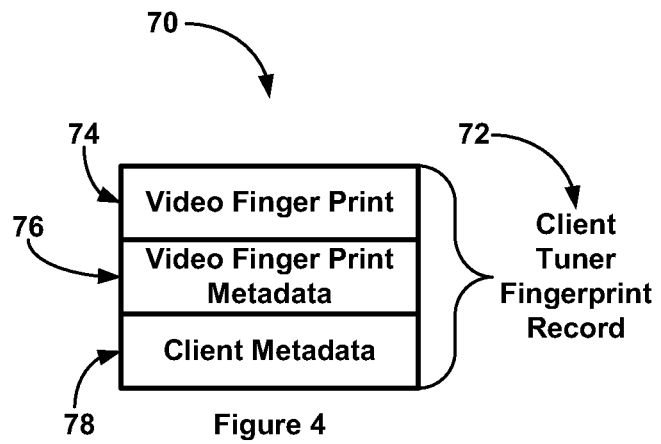
FIG. 4 is a depiction of a client TV fingerprint record constructed by a digital television that can fingerprint digital video content.

FIG. 4 depicts a client tuner record 72 which contains a video finger print 74, video fingerprint metadata 76 that is associated with video fingerprint 74 and client metadata 78. Note that an actual video fingerprint record 72 may contain more or less entries shown in this example.

Note that in the above description, a video fingerprint is generated for each frame of digital video. If the frame rate for a digital video program is thirty frames per second then microprocessor 12 will have 33 milliseconds to generate a video fingerprint 74.

Now referencing FIG. 2 where 40 more fully depicts the process taking place in client television 11 for video fingerprint generation. In this depiction the functional components of client television 11 are depicted as blocks: micro processor 12 of client television 11, video processor 22 and fingerprint server 30.

In this depiction video processor 22 sends frame complete notification 42 to microprocessor 12. Waiting for frame complete notification block 46 is a decision loop where the application looks to see if frame complete notification 42 has been received. If it has NOT been received, control will be transferred back to the input of the loop.

If frame complete notification 42 has been received, control will be transferred to computation block 48 where frame buffer 24 is moved to system memory 14 after which control is passed to processing block compute fingerprint 50. Processing block compute finger print 50 calculates video finger print 74 (FIG. 4) and the other data entries video finger print metadata 76 (FIG. 4) and client metadata 78 (FIG. 4) contained in client tuner fingerprint record 72 (FIG. 4) after which control is transferred to send finger print to server 54.

Processing block send finger print to server 54 will send client tuner fingerprint record 72 via internet 32 to fingerprint server 30. After client TV video fingerprint record 72 has been transferred to fingerprint server 30 control will falltransfer to decision block waiting for frame complete notification block 46.

When fingerprint server 30 has received a client TV fingerprint record 72, it will process the record creating server fingerprint record 82. (FIG. 5). This results in finger print server 30 adding fingerprint server added metadata 90 (FIG. 5) resulting in server fingerprint record 82. (FIG. 5).

Now referencing FIG. 3 where a top level diagram of client television 11, fingerprint server 30, regional fingerprint database 62, content fingerprint database 66 and regional TV database 64 are depicted. In this depiction, client television 11 sends client video fingerprint record 72 to fingerprint server 30 over internet 32. Fingerprint server 30 processes client TV video fingerprint record 72 creating server fingerprint record 82. (FIG. 5). Depending on the regional location of client television 11 as identified in client metadata 78, (FIG. 4/5), server fingerprint record 82 (FIG. 5) will be saved in one of a plurality of regional fingerprint databases 62. Fingerprint server 30 will also save the status of client television 11 and a time stamp in regional TVtuner database 64. This status lets fingerprint server 30 search for the last time a given client television 11 sent data to fingerprint server 30. Fingerprint server 30 will compare the fingerprint and metadata to records contained in content fingerprint database 66 in an attempt to match fingerprints created by client devices (client television 11) to fingerprints of content being broadcasted. If a match cannot be made, content fingerprint database 66 will create "non-matched" entries in a report (not shown).

Fingerprint server 30 will periodically scan regional fingerprint database 62 for a list of channels from a given region to see if there are any channels that have not had server fingerprint record 82 updated for some predetermined period of time indicating that no tuner device in that region has generated a fingerprint for a given channel.

Now referencing FIG. 6 where 100 depicts the processing for this operation. Fingerprint server 30 application operates to verify regional channels 102 by querying any channel in region not being fingerprinted at 104 to regional fingerprint database 62. The entries in regional fingerprint database 62 are scanned by processing block 106 which scans finger print database for channels not being fingerprinted. The result of the scan will be a list of channels not being fingerprinted 108. This result is transferred to application verify channel 102 processing block.

Processing block 110 operates while channels not being fingerprinted >0 to find a tuner to obtain the fingerprint information. The process takes an entry from list of channels not being fingerprinted 108 and sends find tuner in region not sending fingerprints 112 to regional Tuner database 64. Regional tuner database 64 carries out an application scan for "OFF" state tuners 114 by searching its database 64 for client televisions 11 that have not sent an update for a predetermined period of time that may indicate that the television has been turned off by its user. Note that regional tuner database is kept up-to-date by entering tuners into that database anytime the tuner sends the fingerprint information. Hence, the regional tuner database 64 should have an up-to-date list of the different tuners that exist, even those that are turned off.

If there are no "OFF" tuners in the region, no "OFF" tuners 116 will transfer control to processing block 110 while channels not being fingerprinted >0 after which the next channel in the list will be processed. If there are "OFF" tuners in the region, then 'n' "OFF" tuners 120 will send list of 'n' "OFF" tuners 122 to processing block 124 Send Request to an "OFF" Device to Fingerprint a Specific Channel to Client tuner 11.

With client tuner 11 in an 'off' state, it will still have subassemblies that are active and communicating. When client tuner 11 receives request to fingerprint channel 128 from fingerprint server 30, it disables the display subsystem and audio subsystem, commands the tuner to the specific channel after which client television 11 will transfer control to processing block 46 in FIG. 2 to obtain and send a fingerprint.

After the request to fingerprint channel 128 has been sent to client television 11 by processing block send request to an "OFF" device to fingerprint specific channel 124 control will then transfer to processing block 110 while channels not being fingerprinted >0 after which the next channel in the list will be processed.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of materials, e.g., the glass crystals can be pieces formed of any kind of material.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video database system, comprising:
  a computer receiving at least one digital fingerprint indicative of video information over a network from a remote tuner, along with an indication of the specific regional location of the remote tuner that sent the at least one digital fingerprint,
  said at least one digital fingerprint being information that is of a smaller size than the video information it represents, but which can be verified as having been created from the video information;
  said computer comparing said digital fingerprint to first information indicating content and commercial information indicative of what should be included in said video information, and storing the at least one digital fingerprint in a database that has information on multiple different channels when the information is matched along with information about a specific tuner among a plurality of remote tuners that sent the digital fingerprint, and a time stamp indicating when the digital fingerprint was sent, wherein said computer also determines a time since receiving a fingerprint from a specific client tuner, and also maintains a list of tuners in an area, wherein said list of tuners is automatically updated to include a specific client tuner when said metadata is received,
  where said computer operates to automatically determine a channel that has not been fingerprinted in a specified region for a specified amount of time, even if the channel has been fingerprinted in a different region, and determines a tuner which is not currently sending a fingerprint, and to send a command to one of said tuners which is not currently sending a fingerprint to fingerprint said channel.

2. The system as in claim 1, wherein said database is a database that has information on multiple different channels.

3. The system as in claim 1, wherein said database system maintains a list of channels, and maintains a list of fingerprints for the channels.

4. The system as in claim 1, wherein said command includes a command for a tuner which is in an off state to turn on to fingerprint the channel.

5. A video database system, comprising:
   a computer receiving at least one digital fingerprint indicative of video information over a network, along with a piece of information that identifies a specific client tuner among a plurality of different client tuners, that sent the digital fingerprint,
   a database that stores said at least one digital fingerprint along with said information, and a time stamp indicating when the digital fingerprint was sent,
   wherein said database system also maintains a list of tuners in an area based on said information, and
   wherein said list of tuners is automatically updated to include a specific client tuner when information about a new tuner is received
   wherein said database system operates to automatically determine a channel that has not been fingerprinted in a specified amount of time, determines a tuner which is not currently sending a fingerprint, and to send a command to one of said tuners which is not currently sending a fingerprint, in said list to fingerprint said channel,
   and wherein said database system automatically determining a channel that has not been fingerprinted in a specified region for a specified amount of time, even if the channel has been fingerprinted in a different region, and determines a tuner which is not currently sending a fingerprint, and to send a command to one of said tuners which is not currently sending a fingerprint to fingerprint said channel.

6. The system as in claim 5, wherein said computer comparing said digital fingerprint to first information indicating content and commercial information indicative of what should be received as part of said video information, and storing the at least one digital fingerprint in the database when the information is matched along with information about a specific tuner that sent the digital fingerprint, and a time stamp indicating when the digital fingerprint was sent.

7. The system as in claim 6, wherein said at least one digital fingerprint being information that is of a smaller size than the video information it represents, but which can be verified as having been created from the video information.

8. The system as in claim 5, wherein said database is a database that has information on multiple different channels with a list of channels, and maintains a list of fingerprints for the channels.

9. The system as in claim 5, wherein said command includes a command for a tuner which is in an off state to turn on to fingerprint the channel.

\* \* \* \* \*